(12) United States Patent
Wetherill

(10) Patent No.: US 9,136,063 B2
(45) Date of Patent: Sep. 15, 2015

(54) VENT ASSEMBLIES FOR ELECTROCHEMICAL DOUBLE-LAYER CAPACITORS

(75) Inventor: Todd Marshall Wetherill, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 264 days.

(21) Appl. No.: 13/303,517

(22) Filed: Nov. 23, 2011

(65) Prior Publication Data

US 2013/0083451 A1   Apr. 4, 2013

Related U.S. Application Data

(60) Provisional application No. 61/541,521, filed on Sep. 30, 2011.

(51) Int. Cl.
| | |
|---|---|
| *H01G 9/00* | (2006.01) |
| *H01G 9/10* | (2006.01) |
| *H05K 5/06* | (2006.01) |
| *H01G 11/18* | (2013.01) |
| *H01G 11/78* | (2013.01) |
| *H01G 2/08* | (2006.01) |

(52) U.S. Cl.
CPC ............. *H01G 11/18* (2013.01); *H01G 2/08* (2013.01); *H01G 11/78* (2013.01); *Y02E 60/13* (2013.01)

(58) Field of Classification Search
CPC .......... H01G 9/155; H01G 9/10; C03C 29/00
USPC ................................................ 361/518, 502
See application file for complete search history.

(56) References Cited

U.S. PATENT DOCUMENTS

| | | | | |
|---|---|---|---|---|
| 3,096,216 | A | * | 7/1963 | Warren ........................... 429/54 |
| 4,328,289 | A | * | 5/1982 | Zupancic et al. ............... 429/54 |
| 4,338,382 | A | * | 7/1982 | Fritts ............................... 429/53 |
| 4,592,970 | A | * | 6/1986 | Zupancic ........................ 429/82 |
| 5,455,125 | A |   | 10/1995 | Matsumoto et al. |
| 2002/0114991 | A1 | * | 8/2002 | Hallifax et al. ................. 429/53 |
| 2007/0146965 | A1 |   | 6/2007 | Mitchell et al. |
| 2008/0166625 | A1 | * | 7/2008 | Schembri et al. ............... 429/53 |
| 2009/0311583 | A1 |   | 12/2009 | Wu ................................. 429/82 |
| 2010/0215996 | A1 | * | 8/2010 | Wendling et al. ............... 429/54 |
| 2010/0216014 | A1 |   | 8/2010 | Wendling ...................... 429/174 |

FOREIGN PATENT DOCUMENTS

| | | |
|---|---|---|
| EP | 1 786 007 | 5/2007 |
| JP | 10-064767 | 3/1998 |
| JP | 2003-272968 A | 9/2003 |
| JP | 2003-272969 A | 9/2003 |
| JP | 2005-123504 A | 5/2005 |
| WO | 2007/062125 | 5/2007 |

* cited by examiner

*Primary Examiner* — Eric Thomas
*Assistant Examiner* — Arun Ramaswamy
(74) *Attorney, Agent, or Firm* — John L. Haack; Michael W. Russell

(57) ABSTRACT

A container of an electrochemical double-layer capacitor includes a housing, a cap portion adapted to be coupled the housing, an orifice passing through one of the housing or the cap portion, and a vent assembly in fluid communication with the container and secured within the orifice. The housing and the cap portion define an interior envelope of the container, and at least a portion of the vent assembly is located inside the interior envelope of the container.

21 Claims, 4 Drawing Sheets

VENT ASSEMBLIES FOR ELECTROCHEMICAL DOUBLE-LAYER CAPACITORS

CROSS-REFERENCE TO RELATED APPLICATIONS

This application claims the benefit of priority under 35 U.S.C. §119 of U.S. Provisional Application Ser. No. 61/541,521 filed Sep. 30, 2011, the content of which is relied upon and incorporated herein by reference in its entirety.

BACKGROUND

The present disclosure is generally directed to vent assemblies for electrochemical double-layer capacitors.

SUMMARY

Electric double-layered capacitors, or ultracapacitors, are electrochemical energy storage devices that typically exhibit higher energy density than other electrochemical capacitor types. However, when the electrochemical double-layer capacitor is charged at its rated voltage over time, gases can be generated inside the container in which the capacitor is held. This generation of gases is a byproduct of undesired chemical and electrochemical reactions that occur when storing, charging and discharging the electrochemical double-layer capacitor. The generation of gases may tend to increase the internal pressure of the container.

In order to relieve internal pressure that builds within the container holding the electrodes and the electrolyte of the electrochemical double-layer capacitor, a vent assembly may be incorporated into the container. The vent assembly may be located relative to the container such that the vent does not increase the external dimensions of the container. Although the concepts of the present disclosure are described primarily with reference to resealable vent assemblies, it is contemplated that the vent assemblies disclosed herein may also be presented as burst valve assemblies that are not resealable. In one embodiment, a vent assembly may include a vent tube that is located at approximately the centerline of the container, and which extends into the internal envelope of the container. In this embodiment, the vent assembly may include a compression spring that applies a biasing force to a ball that tends to seal the ball against a valve seat. As pressure inside the container increases, the pressure can compress the compression spring and translates the ball away from the valve seat, thereby allowing fluid to flow past the vent. As the pressure inside the container decreases, the vent assembly forms a seal when the compression spring translates the ball against the valve seat. In another embodiment, a vent assembly may include a burst disk positioned inside of the container and in fluid communication with the vent tube, such that in an overpressure event, the fluid inside the container ruptures the burst disk and is vented through the vent tube.

The vent assemblies contemplated herein may also provide a heat transfer path that allows for heat rejection from the electrode and the electrolyte to the external surfaces of the container.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to vent assemblies for electrochemical double-layer capacitors (EDLCs). The EDLC includes a container inside of which an electrode and electrolyte are disposed. The EDLC also includes a vent assembly that is in fluid communication with the electrolyte. Vent assemblies contemplated herein may include a resealable valve assembly that includes a ball and a compression spring that seals the ball against a valve seat. As the pressure inside the container increases due to chemical reactions within the container, the internal pressure of the container applies an opening force to the ball that tends to compress the compression spring. As the opening force exceeds a biasing force that the compression spring applies to the ball, the ball moves from a closed position to an open position, allowing fluid to vent out of the sealed container. In other embodiments, the vent assemblies may include a burst valve assembly located inside of the EDLC container and in fluid communication with a vent tube, such that any fluid venting out of the seal container exits through the vent tube.

Figure 1:
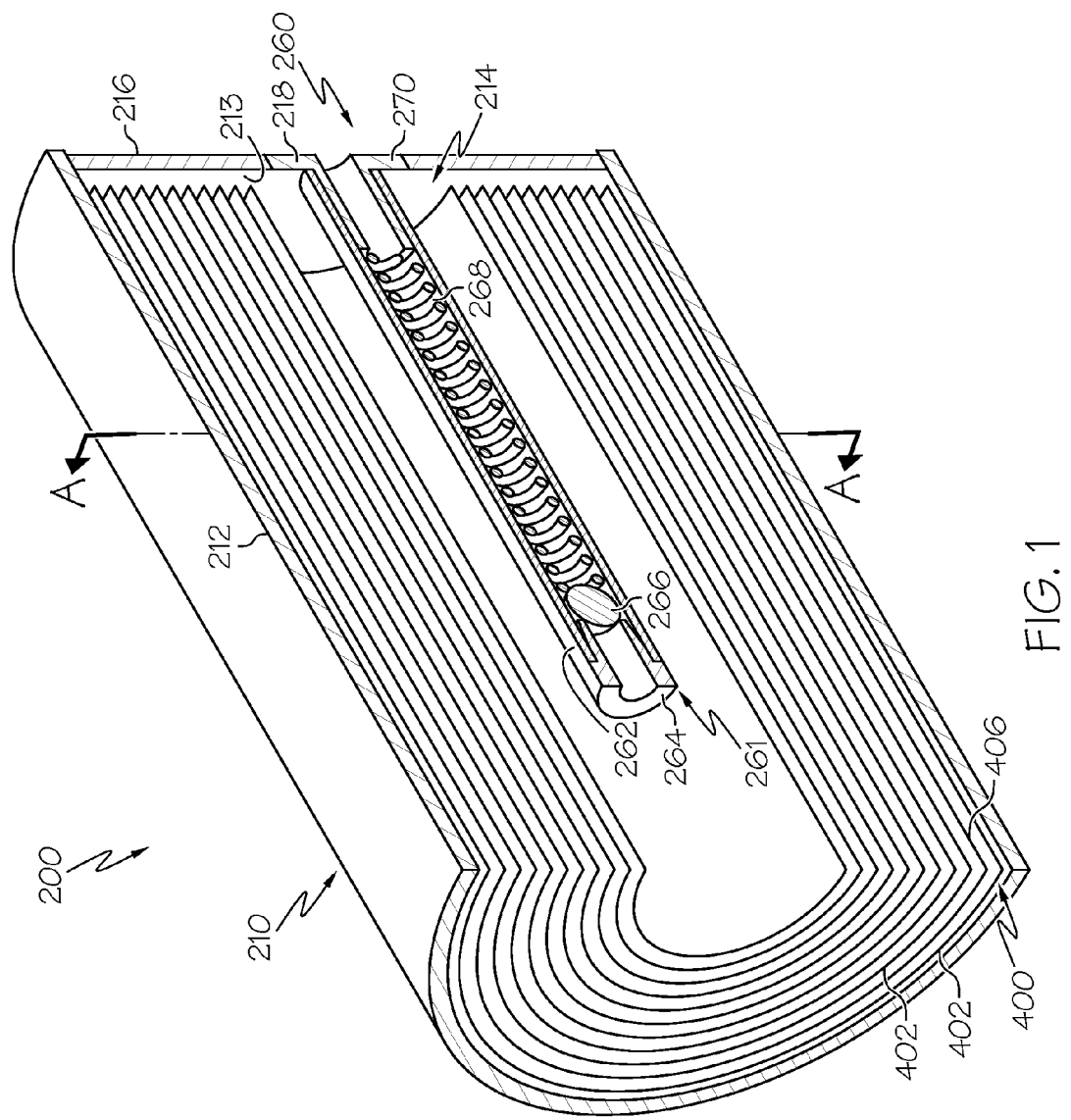
FIG. 1 depicts a cutaway perspective view of an electrochemical double-layer capacitor including a container having a vent assembly according to one or more embodiments shown and described herein.
Figure 2:
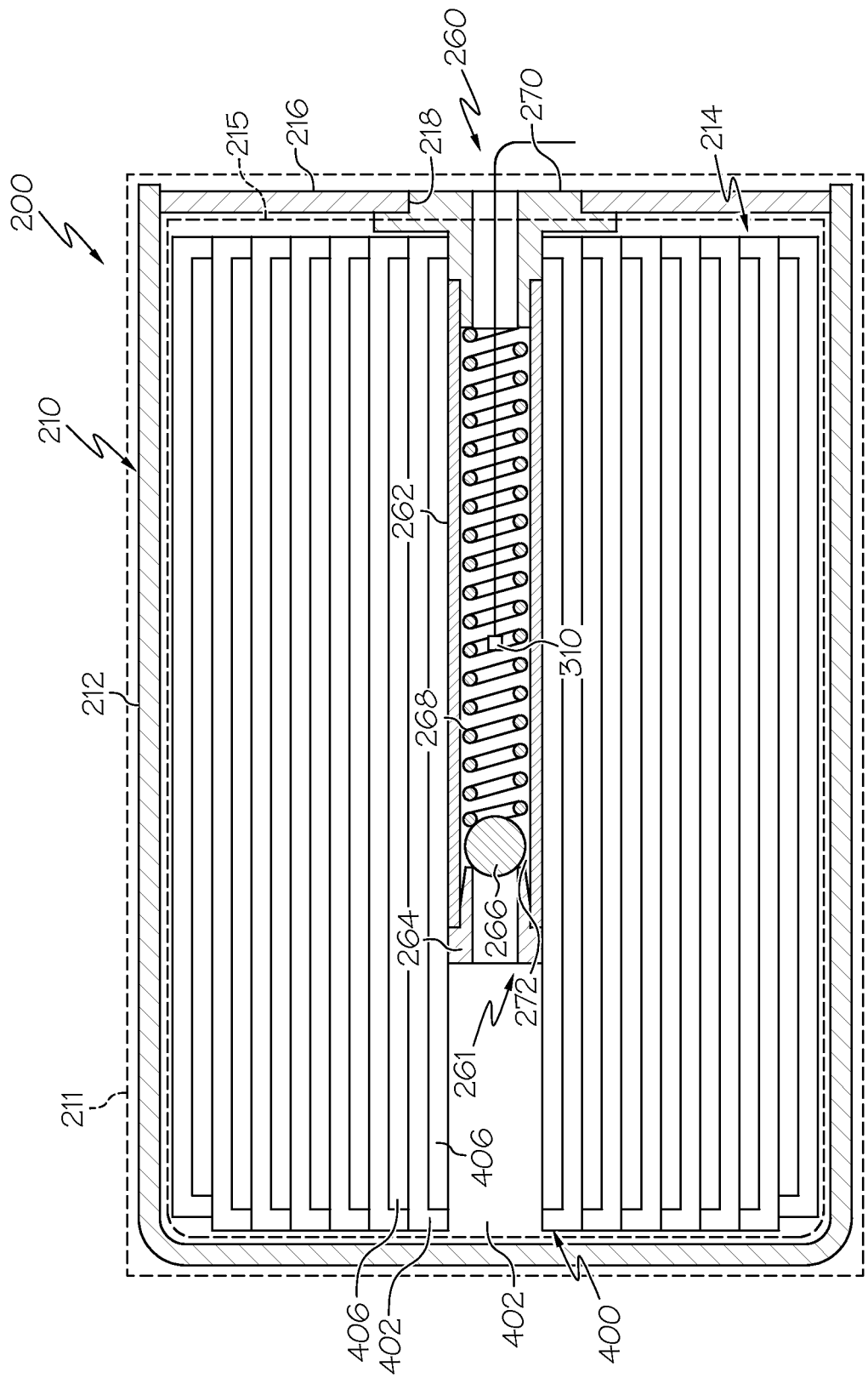
FIG. 2 depicts a schematic side sectional view of an electrochemical double-layer capacitor including a container having a vent assembly shown along line A-A of FIG. 1, according to one or more embodiments shown and described herein.

Referring to FIGS. 1 and 2, an EDLC 200 includes a container 210 having a fluid-tight reservoir 214. In the depicted embodiment, the container 210 includes a housing 212 having a cavity 213 and a cap portion 216 coupled to, or integral to the housing 212. The housing 212 and the cap portion 216 together create a fluid-tight reservoir 214 into which a double-layer capacitor cell 400 can be inserted. The double-layer capacitor cell 400 is surrounded by a liquid electrolyte that fills any voids in the fluid-tight reservoir 214. The interior envelope 215 of the container 210 is defined as the region of the container 210 that is at least partially enclosed by the cavity 213 and the cap portion 216. The exterior envelope 211 of the container 210 is defined as the region of the container 210 that is formed by the exterior-facing surfaces of the housing 212 and the cap portion 216. One of the housing 212 or the cap portion 216 includes an orifice 218 that creates an opening in the container 210.

A vent assembly 260 includes a vent tube 262 that extends into the interior envelope 215 of the container 210, along the inside of a jelly-roll type EDLC 200 electrode 402. The vent assembly 260 is incorporated into the container 210 by mating a portion of the vent assembly 260 with the orifice 218 of the container 210. A resealable vent assembly 261 includes a valve seat 264 located along an end of the vent tube 262 and within the interior envelope 215. The valve seat 264 may be slidably engaged with the vent tube 262. A ball 266 is held against the valve seat 264 by a spring 268, which is retained within the vent tube 262 by an end cap 270. The ball 266 is in fluid communication with the fluid-tight reservoir 214. As illustrated in FIG. 2, by locating the vent assembly 260 such that the vent tube 262 and the spring 268 extend within the interior envelope 215 of the container 210, the addition of the vent assembly 260 into the container 210 does not appreciably change the dimensions of the exterior envelope 211 of the container 210, which is defined by the exterior-facing surfaces of the housing 212 and the cap portion 216.

An electrochemical double-layer capacitor 200 includes a double-layer capacitor cell 400 that includes two electrodes 402 separated by a non-conductive separator layer 406 that physically separates the electrodes 402 and prevents the electrodes 402 from electrically shorting one another. The non-conductive separator layers may be formed from a porous dielectric material including, but not limited to, paper. The double-layer capacitor cell 400 may be a "jelly roll" style, where the electrodes 402 and the non-conductive separator layers 406 are wrapped about one another into a generally cylindrical shape. Electrolyte is dispersed throughout the layers of the double-layer capacitor cell 400. When a voltage is applied across each of the two electrodes 402, the electrolyte can ionize and an electric field on the surface of each electrode 402 can accumulate a charge. The electrochemical double-layer capacitor 200 can store this charge until it is needed, at which time the electrodes 402 can be discharged.

The electrodes 402 according to the present disclosure may include any conductive material suitable for use in an electrochemical double-layer capacitor 200. In one embodiment, at least one of the electrodes 402 comprises a flexible conductive material that can be, for example, folded, rolled, or coiled. In another embodiment, at least one of the electrodes 402 comprises a metal, including, for example, aluminum. In another aspect, one or both of the electrodes 402 comprise a carbon material, including, for example, a carbon coating, that increases the surface area of an electrode 402. It is not required that both electrodes 402 have the same composition and both aspects where the electrodes 402 have the same and different compositions are contemplated. In another embodiment, the electrodes 402 comprise a material compatible with the other materials and electrolytes utilized in the electrochemical double-layer capacitor 200 design.

The electrodes 402 include a material that is substantially non-corrosive in the electrochemical double-layer capacitor 200 environment. In some embodiments, at least one of the electrodes 402 comprises a coating on at least one surface thereof, including, for example, all or a portion of the bulk of the electrode 402. In these embodiments, a carbon coating comprising, for example, a high surface area carbon, is present on at least a portion of one surface of at least one of the electrodes 402. In a further aspect, all of the active areas of an electrode 402 surface comprise a high surface area carbon coating. Electrode 402 and electrode 402 coating materials are commercially available and one of skill in the art may select appropriate electrode 402 and/or electrode 402 coating materials.

The non-conductive separator layer 406 may include, for example, a paper, mica, glass, ceramic, aerogel, silica, non-conductive carbon, polymeric material, or a combination thereof. The non-conductive material is substantially non-conductive under the voltages and operating conditions of operation for a given electrochemical double-layer capacitor 200. The non-conductive separator layer 406 may be porous as to allow an electrolyte to permeate and/or diffuse through the non-conductive separator layer 406.

With the electrodes 402 wound into the generally cylindrical shape, the double-layer capacitor cell 400 is introduced to the cavity 213 of the housing 212. Liquid electrolyte is introduced to the cavity 213 such that the electrolyte surrounds electrodes 402. The cap portion 216 is coupled to and secured to the housing 212, forming a fluid-tight reservoir 214 with the housing 212 that keeps the liquid electrolyte within the housing 212, and therefore the container 210.

Multiple EDLCs 200 may be electrically coupled together to provide the required electrical storage for a given application. A container 210 may include a plurality of fluid-tight reservoirs 214 into each of which a double-layer capacitor cell 400 is inserted.

Figure 3:
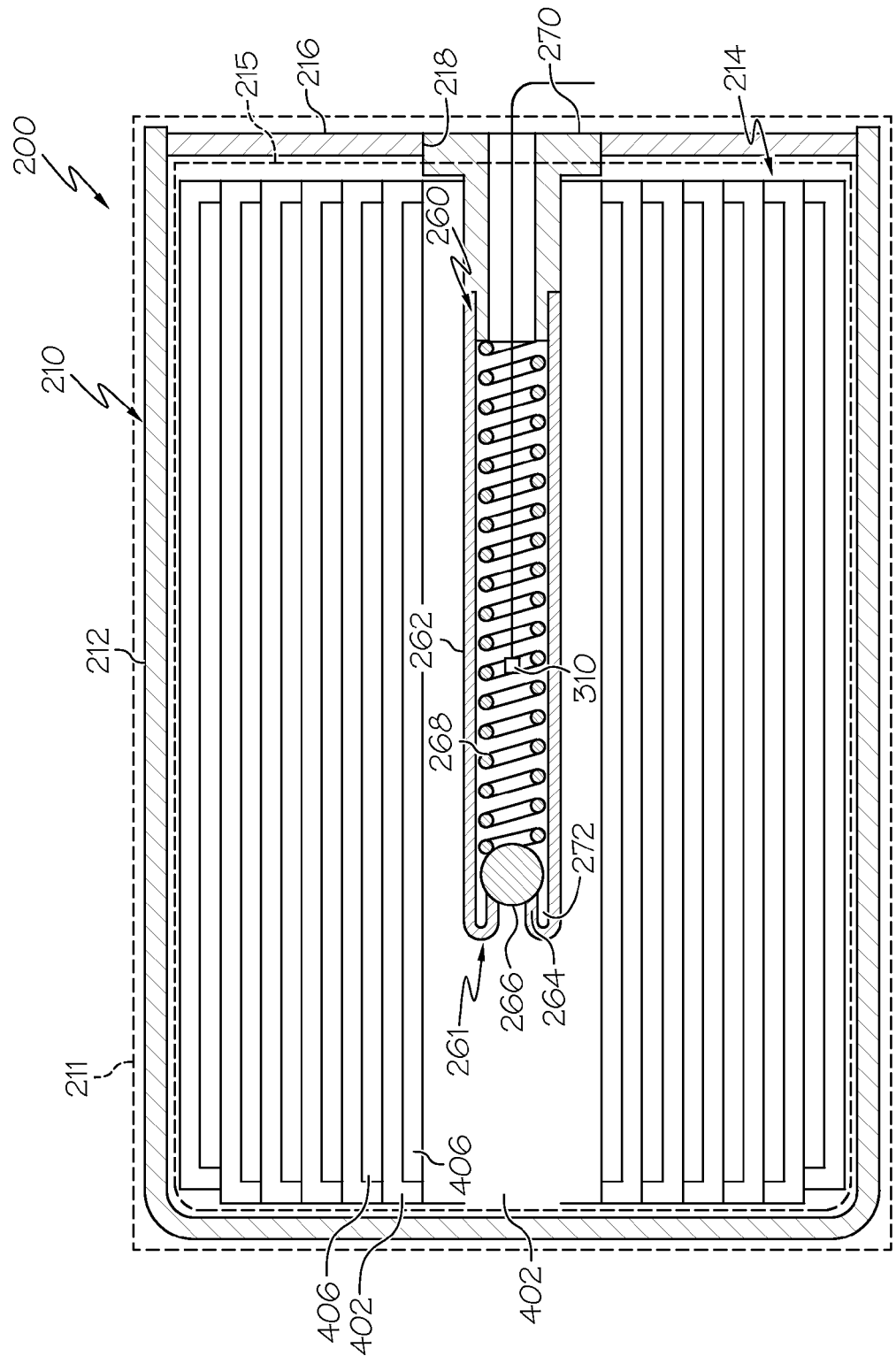
FIG. 3 depicts a schematic side sectional view of an electrochemical double-layer capacitor including a container having a vent assembly according to one or more embodiments shown and described herein.

As illustrated in FIG. 3, in another embodiment of the vent assembly 260 including a resealable vent assembly 261, the valve seat 264 may be incorporated into the vent tube 262, for example, by rolling an edge of the vent tube 262 inwards. The interior of the vent tube 262 near the location of the rolled edge thereby forms the valve seat 264 against which the ball 266 seals.

Figure 4:
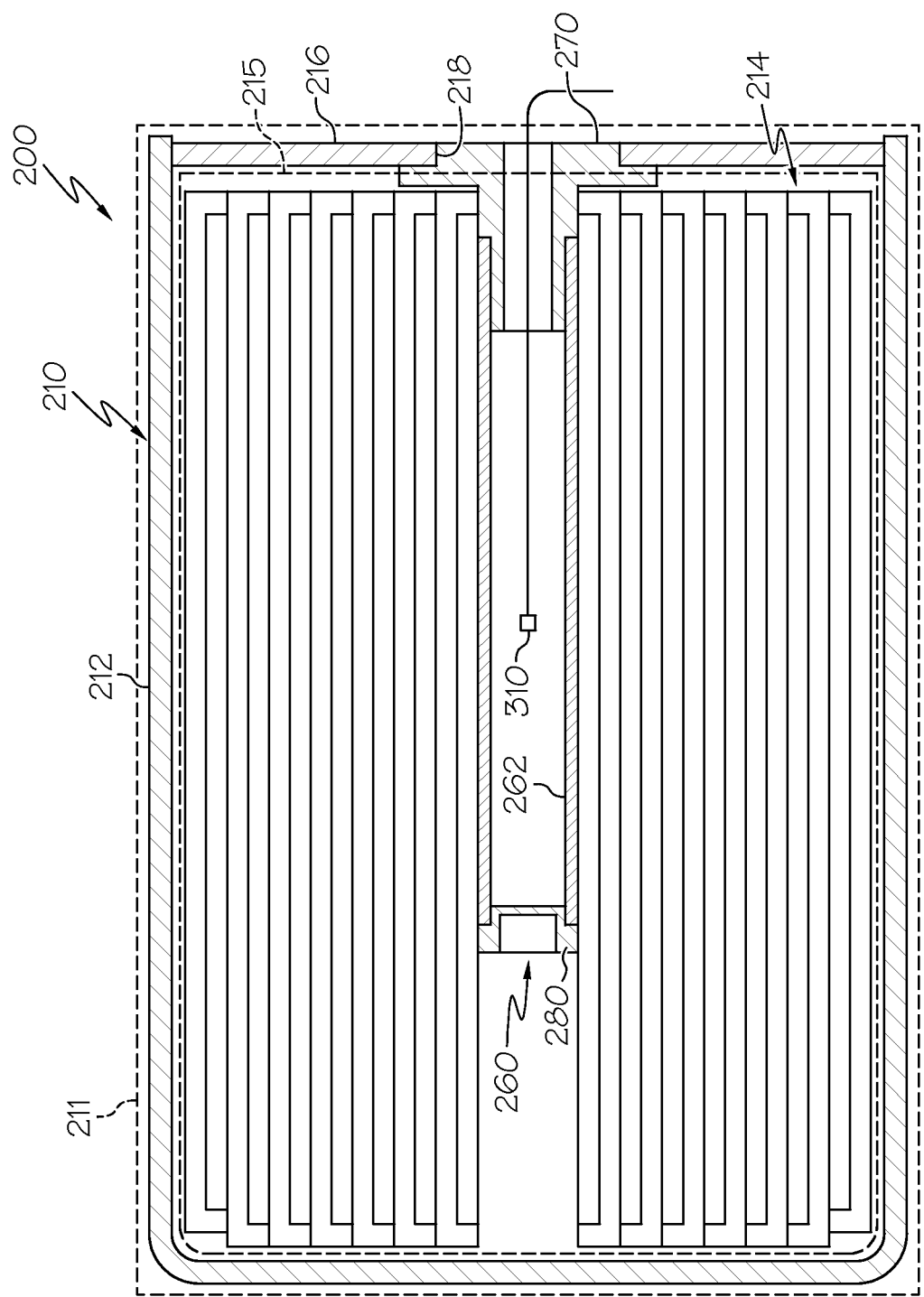
FIG. 4 depicts a schematic side sectional view of an electrochemical double-layer capacitor including a container having a vent assembly according to one or more embodiments shown and described herein.

Referring now to FIG. 4, shown is an EDLC 200 including a vent assembly 260 having a burst disk 280. The burst disk 280 is positioned near an end of the vent tube 262, such that the burst disk 280 is in fluid communication with the fluid-tight reservoir 214 created by the housing 212 and the cap portion 216. The burst disk 280 may be mechanically interlocked with the vent tube 262, for example, by a press fit between adjoining components. In other embodiments, the burst disk 280 may be permanently secured to the vent tube 262 by welding the adjoining components together.

The vent assembly 260 is configured to open at a predetermined internal pressure, so as to vent fluids from the fluid-tight reservoir 214 to alleviate a high-pressure condition inside the container 210. This "blow-off pressure" can be selected based on the structural requirements of the container 210, including thicknesses and materials of the housing 212 and the cap portion 216.

In one embodiment, the blow-off pressure is selected to be approximately 50 psi, such that once pressure inside the container 210 reaches 50 psi, fluid inside the container 210 applies an opening force to the ball 266 of the resealable vent assembly 261 that is greater than the biasing force that the spring 268 applies to the ball 266, or a rupture pressure to the burst disk 280 that is greater than the strength of the burst disk 280. Other blow-off pressures may be selected based on the particular applications.

In embodiments of the container 210 having a vent assembly 260 as illustrated in FIG. 2, as the opening force increases to be greater than the biasing force, the ball 266 translates away from the valve seat 264 and allows fluid to flow out of the fluid-tight reservoir 214 along the vent tube 262. Similarly, in embodiments of the container having a vent assembly as illustrated in FIG. 4, as the interior pressure exceeds the rupture pressure of the burst disk 280, the burst disk 280 will tear or otherwise rupture due to tensile overload and will allow fluid to flow out of the fluid-tight reservoir 214 along the vent tube 262. As the fluid flows out of the fluid-tight reservoir 214, the pressure inside the container 210 decreases, corresponding with a decrease in the opening force applied to the ball 266. As the opening force decreases to be less than the biasing force, the ball 266 translates towards the valve seat 264, and the spring 268 again forms a fluid-tight seal between the ball 266 and the valve seat 264.

The biasing force applied to the ball 266 by the spring 268 is determined by a variety of factors, including the deformed and undeformed length and stiffness of the spring 268. As the stiffness of the spring 268 increases, the biasing force that holds the ball 266 against the valve seat 264 correspondingly increases. In one embodiment, the spring 268 has a spring 268 rate of 5.4 lbf/in and an undeformed length of 1.375 inches. When installed into the vent tube 262 with the ball 266 held against the valve seat 264, the spring 268 has a deformed length of 1.31 inches and provides a biasing force of 0.35 lbf. Because of the relatively small pressure area acting on the ball 266, a "soft" precision spring is used to vent at relatively low pressure inside the container 210, for example, about 50 psi. Because the vent assembly 160 extends into the interior of the container 210 using a vent tube 262, the spring 268 can be long in comparison to the diameter of the spring 268. The increased relative length of the spring 268 offers greater flexibility in design of a soft spring for venting pressure. Variables controlling the stiffness of the spring 268 include the wire diameter (cross-sectional area) of the spring 268, the outer diameter of the spring 268, the number of turns of coil of the spring 268, and the material used to form the spring 268. If the spring 268 was stiffer, for example, because the spring 268 implemented was relatively shorter compared to the diameter, precise control allowing opening of the ball 266 at the blow-off pressure would be difficult.

Vent assemblies 260 including the resealable vent assembly 261 according to the present disclosure allow fluids at elevated pressure, for example, acetonitrile vapor and gases, to escape from the container 210 such that the risk of damage to the container 210 is limited, while at the same time preventing air and water vapor present outside of the container 210 from becoming introduced inside the container 210. Because the ball 266 forms a seal with the valve seat 264 when fluid inside the container 210 is at pressure below the blow-off pressure, the ball 266 will seal against the valve seat 264 with the fluid elevated relative to ambient pressures. As such, during such time that the vent assembly 260 is open and venting fluid, the pressure of the fluid inside of the container 210 will be greater than the pressure of ambient air and water vapor that surrounds the EDLC 200. Thus, the flow of fluid out of the container 210 will tend to prevent air and water vapor from flowing past the vent assembly 260 into the container 210.

Referring to FIGS. 2 and 3, the embodiments of the vent assemblies 260 depicted includes a sharp transition at the valve seat 264, which provides a "line contact" between the ball 266 and the valve seat 264. Further, in some embodiments, the ball 266 is made from an elastomer, for example EPDM or Viton® fluoroelastomer. Balls 266 made from such materials are compliant and may deflect due to the application of the biasing force by the spring 268. In some embodiments, the surface of the ball 266 that is in line contact with the valve seat 264 may deflect in the region of the valve seat 264. Should any of the fluid that escapes from the container 210 remain on the ball 266 and evaporate, leaving solid residual salt on the ball 266, the deflection of the ball 266 against the valve seat 264 will tend to disrupt the salt in the region of the line contact. This deformation of the ball 266 tends to slough the salt off of the ball 266, which encourages the ball 266 to seal with the valve seat 264. Additionally, in some embodiments, the valve seat 264 includes a depression 272 in the region surrounding the valve seat 264. Any fluid that escapes from the container 210 by flowing by the ball 266 may collect in the depression 272 and evaporate without leaving solid residual salt deposits on the sealing surfaces of either the ball 266 or the valve seat 264.

Referring again to FIG. 4, the burst disk 280 may be made from a variety of materials that are impervious to chemical attack from the liquid electrolyte including, for example, aluminum and alloys thereof, steel alloys, and solidified polymers. In some embodiments, the burst disk 280 includes locally-thinned regions that are designed to be the location of tensile overload in the event of an over pressure condition inside the container 210.

The vent assembly 260 also provides a heat conduction path away from approximately the center of the jelly-roll electrode 402 towards the external surfaces of the container 210. Being able to reject heat from the EDLC 200 may allow overall lower capacitor interior temperatures and thus higher reliability and longer life. Additionally, by being able to reject a greater amount of heat, the pack density of a plurality of EDLCs 200 electrically coupled to one another may be increased. By increasing the efficiency at which heat may be rejected from the EDLC 200, smaller and less cumbersome exterior heat sinks may be required. Thus, increasing the rejection of heat from the EDLC 200 may improve packing and packaging of EDLCs 200 in a variety of operation applications.

A plurality of thermocouples 310 may be affixed to the components of the vent assembly 260, for example along the length of the vent tube 262. These thermocouples 310 may be used to evaluate the internal temperature of the EDLC 200 to monitor health and performance of the EDLC 200.

EDLCs 200 according to the present disclosure may be manufactured and assembled according to a variety of methods. In one embodiment, the electrodes 402 may be inserted into the housing 212, and enclosed by the cap portion 216. Separately, the vent assembly 260 may be assembled to include the vent tube 262, the valve seat 264, the ball 266, the spring 268, and the end cap 270. With the electrodes 402 located within the housing 212, the vent assembly 260 is installed through an opening in the cap portion 216 along approximately the centerline of the jelly-roll electrode 402. The vent assembly 260 may then be coupled to the housing 212 or the cap portion 216, for example, in a welding operation, forming the fluid-tight reservoir 214. Alternatively, the vent assembly 260 may be coupled to the housing 212 or the cap portion 216 by a mechanical interlocking, for example a press-fit between the vent assembly 260 and the orifice 218 passing through one of the housing 212 or the cap portion 216.

In another embodiment, the vent assembly 260 may be installed into the cap portion 216 prior to the cap portion 216 being coupled to the housing 212. In this embodiment, the electrodes 402 are inserted into the housing 212, and the cap portion 216 and the vent assembly 260 are coupled to the housing 212 jointly to create the fluid-tight reservoir 214 in the container 210.

In yet another embodiment, the electrodes 402 are formed by rolling unfurled sheets of electrode 402 material about the vent assembly 260. With the electrodes 402 wound about the vent assembly 260, the electrodes 402 and the vent assembly 260 are inserted into the housing 212. The electrodes 402 may be wound into a spiral-like shape that share a common axis with the vent tube 262. Subsequently, the cap portion 216 is coupled to the housing 212 and to the vent assembly 260 to form the fluid-tight reservoir 214 of the container 210.

Components of the vent assembly 260 may be made from a variety of materials including, but not limited to, aluminum and alloys thereof or copper and alloys thereof. Components of the vent assembly 260, for example, the vent tube 262 and the valve seat 264, may be attached to one another through a variety of methods including, but not limited to fastening, adhering, welding, brazing, and/or friction interlocking.

In some embodiments, an electrically insulating member may be located between the vent assembly 260 and the electrodes 402. The electrically insulating member may include, for example, a paper, mica, glass, ceramic, aerogel, silica, non-conductive carbon, polymeric material, or a combination thereof. The electrically insulating member may also include a surface treatment, for example, an electrically insulating oxidation layer applied by an anodization process to the vent assembly 260.

It should now be understood that EDLCs according to the present disclosure include a vent assembly that is located within the interior envelope of the container. The vent assemblies include a vent tube, a ball and a spring located within the vent tube, and a valve seat. The spring applies a biasing force to the ball that seals the ball against the valve seat. The vent assembly allows excess pressure inside the EDLC container to release without allowing ambient air and/or water vapor to enter the container.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A container of an electrochemical double-layer capacitor comprising:
    a housing;
    a cap portion adapted to be coupled to the housing;
    an orifice passing through at least one of the housing or the cap portion; and
    a resealable vent assembly in fluid communication with the container and secured within the orifice, wherein:
        the housing and the cap portion define an interior envelope of the container;
        the resealable vent assembly is located entirely inside the interior envelope of the container;
        the resealable vent assembly comprises a compression spring and a ball and a vent tube extending into the interior envelope of the container, the compression spring being adapted to compress as a force is applied to the ball in a direction corresponding to a direction of the valve seat to the orifice;
        the vent tube has a tube length and a tube diameter; and
        the tube length is at least twice as long as the tube diameter.

2. The container of claim 1, wherein the vent assembly is welded within the orifice.

3. The container of claim 1, wherein the vent assembly is mechanically interlocked with the orifice.

4. The container of claim 1, wherein the housing, the cap portion, and the vent assembly are adapted to create a fluid-tight reservoir for holding a multi-layer capacitor and electrolyte.

5. The container of claim 1, wherein a valve seat of the vent assembly is coupled to the vent tube.

6. The container of claim 1, wherein the ball comprises an elastomer.

7. The container of claim 1, wherein the compression spring is adapted to engage the ball with a valve seat of the resealable vent assembly.

8. An electrochemical double-layer capacitor comprising a container, electrodes, and liquid electrolyte, wherein:
    the container comprises a housing having a recess, a cap portion coupled to the housing, and a vent assembly incorporated into one of the housing or the cap portion;
    the housing and the cap portion define an interior envelope of the container;
    the electrodes, the liquid electrolyte, and the vent assembly are located entirely inside the interior envelope of the container; and
    the vent assembly comprises a vent tube extending into the interior envelope of the container and a thermocouple affixed along the length of the vent tube to evaluate the internal temperature of the capacitor.

9. The electrochemical double-layer capacitor of claim 8, wherein:
    the electrodes are wound relative to one another about a centerline; and
    the vent assembly is located along the centerline of the electrodes.

10. The electrochemical double-layer capacitor of claim 9, wherein at least one of the electrodes contacts the vent assembly.

11. The electrochemical double-layer capacitor of claim 8, wherein the vent assembly is incorporated into one of the housing or the cap portion.

12. The electrochemical double-layer capacitor of claim 8, wherein the electrode is configured as a jelly-roll and the vent assembly provides a heat conduction path away from approximately the center of the jelly-roll electrode towards the external surfaces of the container.

13. The electrochemical double-layer capacitor of claim 8, wherein the vent assembly comprises a resealable vent assembly.

14. The electrochemical double-layer capacitor of claim 8, wherein the vent assembly comprises a burst valve assembly.

15. A container of an electrochemical double-layer capacitor comprising:
    a housing;
    a cap portion adapted to be coupled to the housing;
    an orifice passing through at least one of the housing or the cap portion;
    a vent assembly in fluid communication with the one of the housing or the cap portion and secured within the orifice, wherein:
        the housing and the cap portion define an interior envelope of the container;
        the vent assembly is located entirely inside the interior envelope of the container; and
        the vent assembly comprises a fluid collecting depression formed from a vent tube extending from the orifice into the interior envelope of the container and a valve seat coupled to the vent tube, the depression located at an end of the vent tube opposite the orifice and extending away from the orifice.

16. The container of claim 15, wherein the vent assembly comprises a resealable vent assembly incorporated into the vent tube.

17. The container of claim 16, wherein the resealable vent assembly further comprises a ball and a compression spring adapted to force the ball against the valve seat.

18. The container of claim 17, wherein the compression spring is adapted to compress as a force is applied to the ball in a direction corresponding to a direction of the valve seat to the orifice.

19. The container of claim 1, wherein the tube length is at least four times as long as the tube diameter.

20. The electrochemical double-layer capacitor of claim 8, wherein the tube length is at least four times as long as the tube diameter.

21. The container of claim 15, wherein the vent tube has a tube length and a tube diameter, and the tube length is at least twice as long as the tube diameter.

\* \* \* \* \*